(12) United States Patent
Miura et al.

(10) Patent No.: US 9,614,405 B2
(45) Date of Patent: Apr. 4, 2017

(54) WIRING STRUCTURE OF STATOR COIL

(71) Applicant: SANYO DENKI CO., LTD., Tokyo (JP)

(72) Inventors: Yukio Miura, Tokyo (JP); Masaaki Oohashi, Tokyo (JP); Kouji Nakatake, Tokyo (JP)

(73) Assignee: SANYO DENKI CO., LTD., Tokyo (JP)

( * ) Notice: Subject to any disclaimer, the term of this patent is extended or adjusted under 35 U.S.C. 154(b) by 448 days.

(21) Appl. No.: 14/091,616

(22) Filed: Nov. 27, 2013

(65) Prior Publication Data

US 2014/0152131 A1 Jun. 5, 2014

(30) Foreign Application Priority Data

Nov. 30, 2012 (JP) .................................. 2012-263636

(51) Int. Cl.
*H02K 3/52* (2006.01)
*H02K 3/38* (2006.01)

(52) U.S. Cl.
CPC ............... *H02K 3/38* (2013.01); *H02K 3/522* (2013.01); *H02K 2203/03* (2013.01)

(58) Field of Classification Search
CPC ............. H02K 5/22; H02K 5/225; H02K 3/52
USPC .................................................. 310/71, 194
See application file for complete search history.

(56) References Cited

U.S. PATENT DOCUMENTS

| | | | | |
|---|---|---|---|---|
| 4,287,446 A | * | 9/1981 | Lill | H02K 3/28 310/71 |
| 4,673,834 A | * | 6/1987 | Wrobel | H01R 4/2404 310/71 |
| 5,717,273 A | * | 2/1998 | Gulbrandson | H02K 3/345 310/194 |
| 2003/0071527 A1 | * | 4/2003 | Tetsuka | H02K 3/50 310/71 |
| 2004/0051417 A1 | | 3/2004 | Yamazaki et al. | |
| 2009/0058216 A1 | | 3/2009 | Sakata | |
| 2009/0096330 A1 | | 4/2009 | Seidler et al. | |

FOREIGN PATENT DOCUMENTS

| | | |
|---|---|---|
| JP | H01-134950 U | 9/1989 |
| JP | H08205491 A | 8/1996 |

(Continued)

OTHER PUBLICATIONS

Japanese Office Action of foreign counterpart application No. 2012-263636 dated Feb. 2, 2016.

(Continued)

*Primary Examiner* — Thomas Truong
(74) *Attorney, Agent, or Firm* — Polsinelli PC

(57) ABSTRACT

Electrical insulation properties of winding start ends or terminal ends of insulating coating electric wires of coils wound around polar teeth of a stator core are improved, and creeping and spatial distances for electrical insulation are secured. Wall portions which project toward an interior of a radial direction or an exterior of an axial direction of a stator core and which have electrical insulation properties are formed in an inner peripheral portion of the stator core of a motor, groove portions are formed in the wall portions and winding start ends or terminal ends of insulating coating electric wires of coils are arranged in the groove portions.

8 Claims, 3 Drawing Sheets

(56) References Cited

FOREIGN PATENT DOCUMENTS

| | | |
|---|---|---|
| JP | 10-174337 | 6/1998 |
| JP | H10-304613 A | 11/1998 |
| JP | 2002176753 A | 6/2002 |
| JP | 2005245140 A | 9/2005 |
| JP | 2008-054390 A | 3/2008 |
| JP | 2009055741 A | 3/2009 |
| JP | 2009-077515 A | 4/2009 |
| JP | 2011151973 A | 8/2011 |

OTHER PUBLICATIONS

Office Action dated Jun. 14, 2016 from corresponding Japanese Patent Application No. 2012-263636, pp. 1-4.

* cited by examiner

WIRING STRUCTURE OF STATOR COIL

CROSS-REFERENCE TO RELATED APPLICATION

This application claims priority to Japanese Application No. 2012263636, filed Nov. 30, 2012, the entirety of which is incorporated herein by reference.

BACKGROUND

1. Technical Field

The invention relates to a wiring structure of winding start ends or terminal ends of insulating coating electric wires of coils wound around polar teeth of a stator core of a motor.

2. Description of Related Arts

A plurality of coils is formed by winding insulating coating electric wires such as enamel wires around a plurality of polar teeth of a stator core of a motor. Poles of the coils are connected by jumper wires to form respective phases of the motor. A winding start end or terminal end of an insulating coating electric wire of a coil in each phase is connected with an external power line on a printed circuit board.

A wiring nozzle which winds the insulating coating electric wire around polar teeth is moved from a center side of the stator core to an outer side, and therefore the winding start end or terminal end of the insulating coating electric wire is arranged along an inner peripheral portion of the stator core. After the printed circuit board is arranged, in an outer rim portion, the winding start end or terminal end of the insulating coating electric wire is raised from the coil to the above of the printed circuit board. At a site at which the winding start end or terminal end of the insulating coating electric wire is raised from the coil, there is no insulating resin molded item (end form) which electrically insulates the stator core and the coil.

The raised insulating coating electric wire is folded toward an interior in the outer rim portion of the printed circuit board, and is soldered to a wiring pattern on the printed circuit board. Upon soldering of a start end or a terminal end of the insulating coating electric wire to a wiring pattern of the printed circuit board, a concavity formed in the outer rim portion of the printed circuit wire is used as a guide for wiring.

The jumper wires between the poles of the coils are arranged along the inner peripheral portion of the stator core, and therefore when winding start ends or terminal ends of the insulating coating electric wires are raised in the outer rim portion of the printed circuit board, sites at which the start ends or the terminal ends of the insulating coating electric wires and the jumper wires cross are produced.

As a technique related to the wiring structure of wire ends of insulating coating electric wires of coils, a stator in which grooves which connect inner peripheral sides and outer peripheral sides of polar tooth portions are provided in an end plate which covers polar teeth of a stator core and insulates the stator core and a wire, and which binds only the wires or the wires and a wire end unit by insulating yarns which are passed through the groove of the end plate is disclosed (see, for example, Japanese Patent Application Laid-Open No. 10-174337).

SUMMARY

Meanwhile, in a conventional wiring structure of a stator coil, folded sites of the insulating coating electric wires in an outer rim portion of a printed circuit board does not have an electric insulator with respect to an inner wall of a neighboring metal casing (cap), and therefore there is a problem that a creeping distance required for insulation cannot be secured and electrical insulation performance deteriorates.

Upon bonding of a start end or a terminal end of an insulating coating electric wire of a coil in each phase to a wiring pattern of a printed circuit board, although a concavity formed on the printed circuit board is used as a guide for wiring, the insulating coating electric wire is easily detached from the concavity and cannot be positioned only by the concavity.

Therefore, misalignment of insulating coating electric wires causes failure of soldering, and, when excessive heat is applied by repeating a soldering operation, an insulating coating of an electric wire is burned and electrical insulation performance significantly deteriorates, thereby causing short-circuiting.

When a start end or a terminal end of an insulating coating electric wire of a coil in each phase is raised in an outer rim portion of the printed circuit board, the insulating coating electric wire and a jumper wire which forms a phase of a motor cross and contact with each other, and therefore there is a problem that creeping and spatial distances for electrical insulation cannot be secured.

When it is necessary to secure an electrical insulation distance for crossing of insulating coating electric wires of coils because of a demand of a security standard, a measure, for example, of inserting an insulating tube at a crossing/contacting site is required.

Further, an object of the technique of Japanese Patent Application Laid-Open No. 10-174337 is to, by binding a stator core and wires with insulating yarns which are threaded in grooves of an insulating end plate, improve the adhesiveness between coils, reduce space of a wiring end portion or a wiring end portion, reduce a man-hour of the wiring end and, provide an inexpensive stator. Accordingly, the technique of Japanese Patent Application Laid-Open No. 10-174337 does not take into account improvement of electrical insulation performance of start ends or terminal ends of insulating coating electric wires of coils in each phase wound around polar teeth of a stator core, and securement of creeping and spatial distances for electrical insulation.

The invention is created in light of the above situation, and an object of the invention is to provide a wiring structure of a stator coil which can improve electrical insulation performance of start ends or terminal ends of insulating coating electric wires of coils of respective phases wound around polar teeth of a stator core and secure creeping and spatial distances for electrical insulation.

In a wiring structure of a stator coil according to the invention which achieves the above object, a wall portion which projects to an interior of a radial direction or an exterior of an axial direction of a stator core and which has an electrical insulation property is formed in an inner peripheral portion of the stator core of a motor. A groove portion is formed at the wall portion.

A winding start end or terminal end of an insulating coating electric wire of the coil in each phase is provided in the groove portion.

In a wiring structure of a stator coil according to the invention, at wall portions which are provided in the inner peripheral portion of a stator core to project to an interior of a radial direction or an exterior of an axial direction of a stator core and which have electrical insulation properties, groove portions are formed. Further, start ends or terminal ends of insulating coating electric wires of the coils wound around polar teeth of the stator core are arranged in the groove portions.

Consequently, according to the wiring structure of the stator coil according to the invention, winding start ends or terminal ends of insulating coating electric wires of coils in each phase are arranged in the groove portions of the wall portions which have electrical insulation properties, so that it is possible to improve electrical insulation performance and secure creeping and spatial distances for electrical insulation.

DETAILED DESCRIPTION

Hereinafter, a wiring structure of a stator coil according to a first embodiment and a second embodiment will be described with reference to the drawings. In addition, although the wiring structure of the stator coil according to the first embodiment and the second embodiment will be described using a stator of a stepping motor as an example, the invention is not limited to this, and is also applicable to stators of other motors.

According to the first embodiment and the second embodiment, wall portions which project to an interior of a radial direction or an exterior of an axial direction of a stator core and which have electrical insulation properties are formed at an inner peripheral portion of the stator core of a motor, and groove portions are formed in the wall portions. Start ends or terminal ends of insulating coating electric wires of the coils wound around polar teeth of the stator core are arranged in the groove portions.

Consequently, according to the first embodiment and the second embodiment, a wiring structure of a stator coil which can improve performance of electrically insulating winding start ends or terminal ends of insulating coating electric wires of coils in each phase and secure creeping and spatial distances for electrical insulation is realized.

[First Embodiment]
<Configuration of Wiring Structure of Stator Coil>

Figure 1:
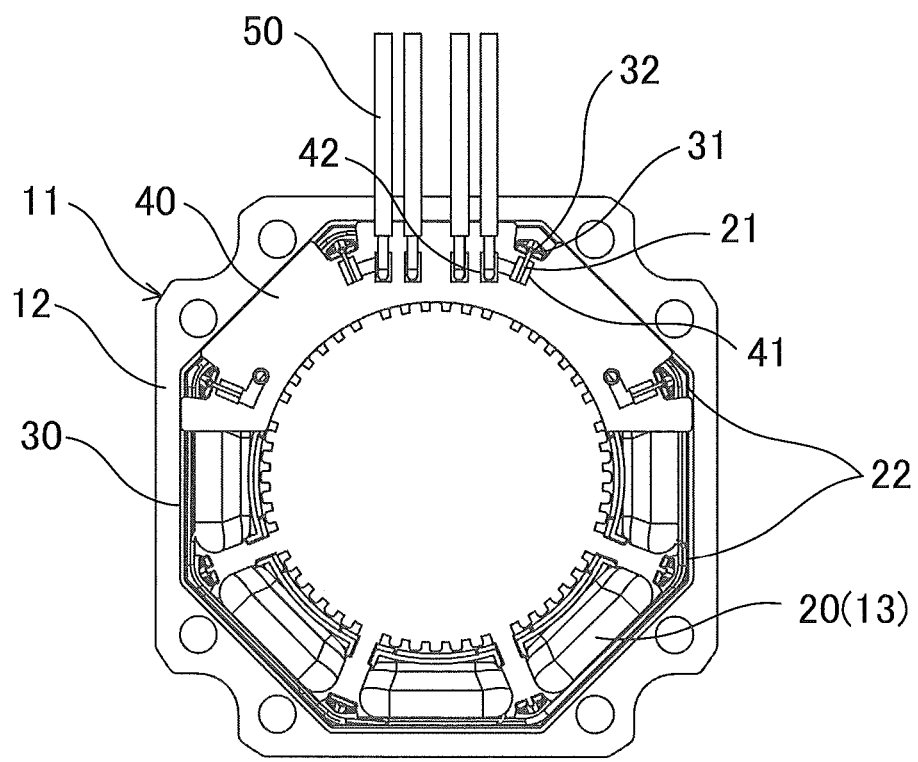
FIG. 1 is a front view of a wiring structure of a stator coil according to a first embodiment.
Figure 2:
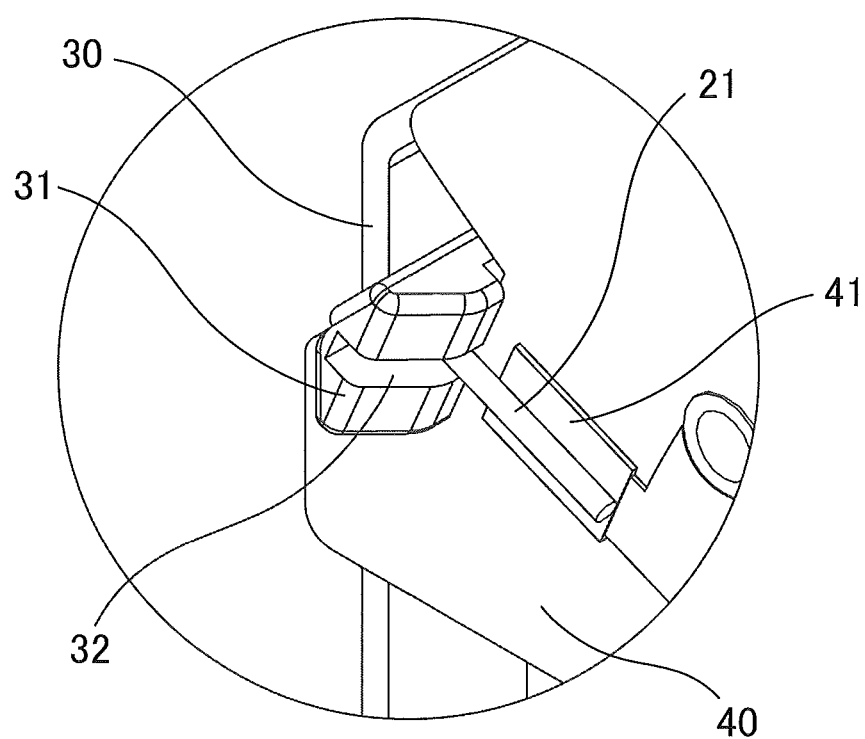
FIG. 2 is a perspective view of main components of the wiring structure of the stator coil according to the first embodiment.

First, a wiring structure of a stator coil according to the first embodiment will be described with reference to FIGS. 1 and 2. FIG. 1 is a front view of the wiring structure of the stator coil according to the first embodiment. FIG. 2 is a perspective view of main components of the wiring structure of the stator coil according to the first embodiment.

As illustrated in FIG. 1, a stator core 11 of a stator 10 of a stepping motor has a plurality of polar teeth 13. Insulating coating electric wires 21 such as enamel wires are wound around the polar teeth 13 to form a plurality of coils 20. The poles of the coils 20 are connected to each other by jumper wires 22 to form phases of a motor.

The stator core 11 has a plurality of polar teeth 13. The stator core 11 is formed by, for example, soft magnetic metal such as silicon steel. To fix at desired positions the stator core 11 and a rotor which is not illustrated, a metal casing which is not illustrated is used.

In a roughly hexagonal inner peripheral portion of the metal casing, an insulating resin molded item (end form) 30 which electrically insulates the polar teeth 13 of the stator core 11 and the coils 20 is provided. The insulating resin molded item 30 is arranged to cover a plurality of polar teeth 13, and has a roughly hexagonal cylindrical shape.

In the inner peripheral portion of the stator core 11, wall portions 31 which project toward an interior of a radial direction of the stator core 11 and which have electrical insulation properties are formed. The wall portions 31 are not limited to this, and may be formed in the inner peripheral portion of the stator core 11 to project toward an exterior of an axial direction of the stator core 11. In the present embodiment, at each corner portion of the inner periphery of the insulating resin molded item 30, the wall portion 31 is integrally formed with the insulating resin molded item 30.

Although the wall portion 31 according to the present embodiment functions as a member which fixes a wiring substrate 40 and has a hook shape for fixing, the shape thereof is not limited to the hook shape.

The wiring substrate 40 is fixed so as to cover the coils 20 from an outer side of the axial direction using the wall portions 31. More specifically, the wiring substrate 40 is fixed by fitting the wiring substrate 40 to the wall portions 31 or by crashing the wall portions 31 and fitting the wiring substrate 40 thereto.

Although a printed circuit board on which wiring patterns are formed by a photolithography technique is used as the wiring substrate 40 according to the present embodiment, the wiring substrate is not limited to this, and a wiring substrate on which wiring patterns are formed by a thin copper plate may be used.

As illustrated in FIG. 2, in the wall portion 31, a groove portion 32 through which a winding start end or terminal end of the insulating coating electric wire of the coil 20 is passed is formed. The groove portion 32 is linearly formed on a substrate abutting surface side of the wall portions 31 along the axial direction of the stator 10. A cross-sectional shape of the groove portion 32 of the wall portion 31 according to the first embodiment is formed in a concave shape. In the present embodiment, although one groove portion 32 is formed in each wall portion 31, the number of groove portions 32 is not limited to this and may be plural.

After the winding start end or terminal end of the insulating coating electric wire 21 raised from the coil 20 is arranged in the groove portion 32 of the wall portion 31, the wiring substrate 40 is fixed to the wall portion 31.

The insulating coating electric wire 21 is folded inward in the wall portion 31 provided in the outer rim portion of the wiring substrate 40. An exposed end of the insulating coating electric wire 21 is soldered onto the wiring pattern 41 on the wiring substrate 40.

An exposed end of a power line 50 is soldered onto a wiring pattern 42 on the wiring substrate 40 similar to the insulating coating electric wire 21. Through the wiring patterns 41 and 42 on the wiring substrate 40, the insulating coating electric wires 21 of the coil 20 ends and the power lines 50 are connected. In addition, two left power lines 50 and two right power lines 50 according to the present embodiment form two phases, and the two left lines and the two right lines are alternately applied a current from a power source which is not illustrated.

The jumper wire 22 is arranged on the base end of the wall portion 31 and held to form each phase between the poles of each coil 20.

<Operation of Wiring Structure of Stator Coil>

Next, an operation of the wiring structure of the stator coil according to the first embodiment will be described with reference to FIGS. 1 and 2.

As illustrated in FIG. 1, the stator 10 according to the present embodiment is an armature in which a plurality of coils 20 is built. In a hollow portion of the stator 10, a rotor as an exciting portion not illustrated is arranged. For example, with a permanent magnetic rotor of a stepping motor, one permanent magnet is usually built in a rotor core.

As illustrated in FIGS. 1 and 2, the winding start ends or terminal ends of the insulating coating electric wires 21 wound as coils 20 around a plurality of polar teeth 13 of the stator core 11 are arranged in the groove portions 32 formed on the substrate abutting surface sides of the wall portions 31. After the winding start end or terminal end of the insulating coating electric wire 21 of the coil in each phase is arranged in the groove portion 32, the wiring substrate 40 is fixed to the hook-shaped wall portions 31. Hence, the openings of the groove portions 32 are blocked by the wiring substrate 40, and the winding start ends or terminal ends of the insulating coating electric wires 21 of the coils 20 in each phase are surrounded in the groove portions 32 and are reliably held.

The winding start end or terminal end of the insulating coating electric wire 21 of the coil 20 in each phase is arranged in the groove portion 32 of the wall portion 31, and the jumper wire 22 between the poles of the coil 20 is hooked on the base end of the wall portion 31 and held. Consequently, insulating creeping and spatial distances between the insulating coating electric wires 21 and the jumper wires 22 of the coils 20 (distances between live parts and conductors) are secured, so that it is possible to improve the electrical insulation properties of the winding start ends or terminal ends of the insulating coating electric wires 21 of the coils 20 in each phase without requiring additional man-hour or material cost.

The winding start ends or terminal ends of the insulating coating electric wires 21 of the coils 20 in each phase are arranged in the groove portions 32 of the wall portions 31 and folded toward the wiring substrate 40 side in the wall portions 31, so that it is possible to reliably position the insulating coating electric wires 21. Consequently, the exposed ends of the insulating coating electric wires 21 are easily soldered onto the wiring patterns 41 of the wiring substrate 40, so that deterioration of the insulating coatings of the insulating coating electric wires 21 due to bonding heat hardly occurs and it is possible to prevent short-circuiting due to a decrease in insulation performance of the insulating coating electric wires 21.

The wall portion 31 which has the groove portion 32 is arranged at each corner portion of the inner periphery of the insulating resin molded item 30 and is positioned between the poles of the coil 20, so that it is possible to secure a distance to the coils 20 wound around the polar teeth 13 and maintain insulating performance of the insulating coating electric wires 21 even when deterioration of the insulating coating occurs due to bonding heat of soldering.

The wiring structure of the stator coil according to the present embodiment can secure insulating creeping and spatial distances between the winding start ends or terminal ends of the insulating coating electric wires 21 of the coils 20 in each phase and, consequently, can also maintain a high dielectric strength voltage of the motor.

[Second Embodiment]

Figure 3:
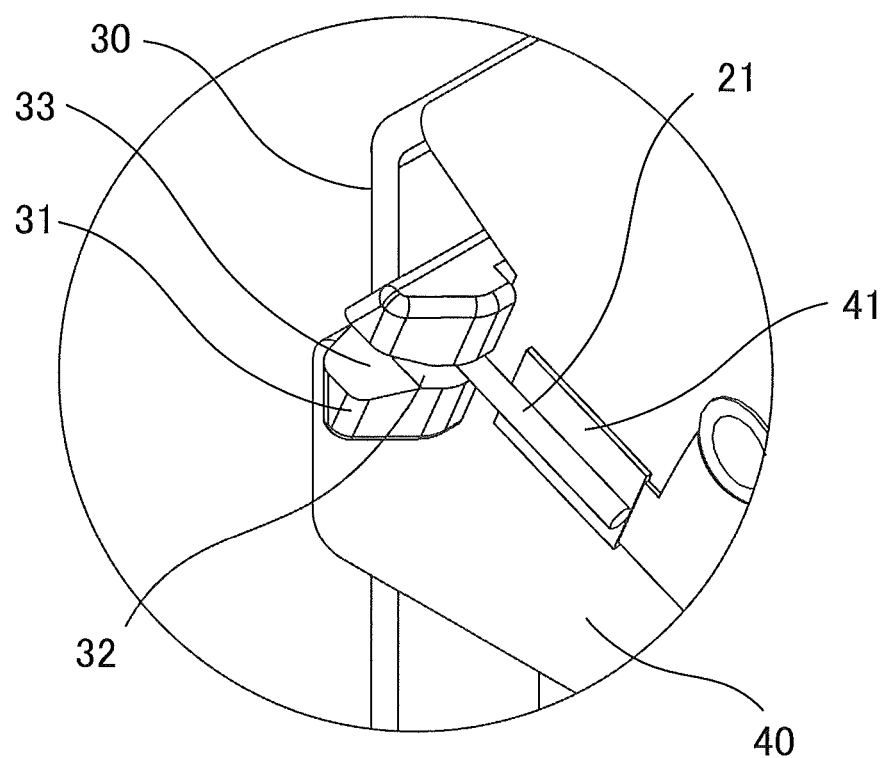
FIG. 3 is a perspective view of main components of a wiring structure of a stator coil according to a second embodiment.

Next, a wiring structure of a stator coil according to the second embodiment will be described with reference to FIG. 3. FIG. 3 is a perspective view of the wiring structure of the stator coil according to the second embodiment.

As illustrated in FIG. 3, the wiring structure of the stator coil according to the second embodiment differs from the first embodiment in shapes of groove portions 32 of wall portions 31.

That is, in the wall portion 31 according to the second embodiment, the groove portion 32 is linearly formed on a substrate abutting surface side of the wall portion 31 along an axial direction of a stator 10. Although one groove portion 32 is formed in each wall portion 31 in the present embodiment, the number of groove portions 32 is not limited to this and may be plural. A cross-sectional shape of the groove portion 32 is formed in a concave shape. An upper groove 33 continues to an upper portion of a hook shape so as to be orthogonal to the concave groove portion 32. Although the cross-sectional shape of the upper groove 33 according to the present embodiment is formed in a V shape, the cross-sectional shape is not limited to this and may take any shape as long as this shape serves as a guide such as a U shape or a concave shape.

A wire nozzle which winds an insulating coating electric wire around polar teeth moves to an outer side from a center side of a stator core, and therefore a winding start end or terminal end of the insulating coating electric wire of the coil 20 in each phase is arranged along an inner peripheral portion of the stator core. In an outer rim portion of the wiring substrate 40, the winding start end or terminal end of the insulating coating electric wire 21 is raised from the coil 20 to the above of the wiring substrate 40. The upper groove 33 having a V-shaped cross section serves as a guide when the winding start end or terminal end of the insulating coating electric wire 21 is arranged outside the wiring substrate 40.

That is, when the winding start end or terminal end of the insulating coating electric wire 21 is arranged in the outer rim portion after the coil 20 is wound, the insulating coating electric wire 21 is arranged along the upper groove 33 of the upper part of the hook shape, and the insulating coating electric wire 21 is lead to the outer rim portion from a fixed position and is reliably arranged outside the wiring substrate 40. The V-shaped cross section of the upper groove 33 is a device which fixes the center of the insulating coating electric wire 21 along the V shape even when a wire diameter of the insulating coating electric wire 21 changes, and also serves as a guide of the insulating coating electric wire 21 even when the cross-sectional shape takes a U shape or a concave shape.

The insulating coating electric wire 21 can be positioned at the position of the concave groove portion 32, so that the exposed end of the insulating coating electric wire 21 can be well soldered to the wiring pattern 41 of the wiring substrate 40.

Further, at the position along the groove portion 32, the winding start end or terminal end of the insulating coating electric wire 21 is raised from the coil 20, so that, by shaping the upper groove 33 into a V shape, it is possible to arrange the insulating coating electric wire 21 outside along the upper groove 33. Consequently, it is possible to easily arrange the wiring substrate 40 at the wall portions 31 without the insulating coating electric wires 21 being detached from the groove portions 32, and there is no concern that troubles such as arrangement failure or electric wire fracture of the wiring substrate 40 occur.

The wiring structure of the stator coil according to the second embodiment provides basically the same operation and effect as those in the first embodiment. In the wiring structure of the stator coil according to the second embodiment in particular, the upper groove portions which serve as guides continue to the groove portions 32, so that it is possible to arrange the winding start ends or terminal ends of the insulating coating electric wires 21 outside along the upper grooves 33. As a result, the wiring structure of the stator coil according to the second embodiment provides a unique effect such that it is possible to easily arrange the wiring substrate 40 to the wall portions 31 without the insulating coating electric wires 21 being detached from the groove portions 32, to well solder the exposed ends of the insulating coating electric wires 21 and to easily arrange the wiring substrate 40.

Although preferred embodiments of the invention have been described above, these embodiments are exemplary for description of the invention, and are not intended to limit the scope of the invention only to the embodiments. The invention can be implemented in various modes different from the above embodiments in a range which does not deviate from the scope of the invention.

Although the openings of the groove portions 32 of the wall portions 31 are blocked by the wiring substrate 40 in the embodiments, the invention is not limited to this and the openings may be blocked by an electrical insulating member which is a member different from the wiring substrate 40.

Further, although a bonding means has been described using solder bonding in the above embodiments, the invention is not limited to this and other bonding means such as welding, adhesion and thermal compression bonding may be used.

What is claimed is:

1. A wiring structure of a stator coil wherein
    a wall portion which projects to an interior of a radial direction of a stator core and which has an electrical insulation property is formed in an inner peripheral portion of the stator core of a motor, and a groove portion is formed in the wall portion, and
    a winding start end or terminal end of an insulating coating electric wire of the coil is arranged in the groove portion;
    a wiring substrate which connects an insulating coating electric wire of the coil and a power line; and
    wherein the wire extends through the groove portion inward in a radial direction of the wiring substrate from a position external in the radial direction of the wiring substrate and contacts a terminal of the power line;
    wherein the wall portion has a shape as pair of hooks adapted to engage and fix an outer circumference of the wiring substrate, the hooks extending inward in the radial direction of the stator core, and the groove portion is defined by interior faces of the pair of hooks.

2. The wiring structure of the stator coil according to claim 1, wherein the wall portion is provided in an insulating resin molded item which insulates the stator core and the coil so as to project toward the interior of the radial direction or the exterior of the axial direction of the stator core.

3. The wiring structure of the stator coil according to claim 1, wherein
    the wall portion is arranged between poles of the coil, and
    the groove portion is opened toward the interior of the radial direction of the stator core.

4. The wiring structure of the stator coil according to claim 1, wherein an opening of the groove portion in which a start end or a terminal end of an insulating coating electric wire of the coil is arranged is blocked by an electrical insulating member.

5. The wiring structure of the stator coil according to claim 4, wherein the electrical insulating member which blocks the opening of the groove portion is a wiring substrate which connects the insulating coating electric wire of the coil and a power line.

6. The wiring structure of the stator coil according to claim 1, wherein an upper groove is formed to continue to the groove portion and orthogonal to the wall portion.

7. The wiring structure of the stator coil according to claim 1, wherein a jumper wire of the coil which forms a phase of the motor is arranged on a base end of the wall portion.

8. The wiring structure of the stator coil according to claim 1, wherein the wire extends axially along the stator coil, bends radially inwardly at the pair of hooks and extends radially between the pair of hooks to reach the terminal of the power line.

* * * * *